United States Patent [19]
Hansen et al.

[11] Patent Number: 6,130,488
[45] Date of Patent: Oct. 10, 2000

[54] SWITCHING FILTER PRODUCING A LOW IMPEDANCE CONTROL INPUT ON A HIGH IMPEDANCE INPUT LINE FOR DISCRIMINATING FALSE CONTROL SIGNALS

[75] Inventors: James E. Hansen, Oak Creek; Michael R. Scharnick, Brookfield; Thomas A. Wilsdon, Pewaukee, all of Wis.

[73] Assignee: Eaton Corporation, Cleveland, Ohio

[21] Appl. No.: 08/969,989

[22] Filed: Nov. 13, 1997

[51] Int. Cl.[7] .......................................... H02J 1/02
[52] U.S. Cl. .......................... 307/125; 307/105; 318/768; 318/778; 327/551; 327/552
[58] Field of Search ..................... 307/105, 108, 307/127, 116, 125, 109; 327/551, 552; 361/111; 318/767, 778; 324/500; 702/58

[56] References Cited

U.S. PATENT DOCUMENTS

| | | | |
|---|---|---|---|
| 4,456,867 | 6/1984 | Mallick et al. | 318/778 |
| 4,461,986 | 7/1984 | Maynard et al. | 307/127 |
| 4,481,426 | 11/1984 | Nakagawa et al. | 327/551 |
| 4,728,810 | 3/1988 | Engel | 307/108 |
| 5,216,621 | 6/1993 | Dickens | 324/500 |
| 5,444,309 | 8/1995 | Innes et al. | 307/125 |

*Primary Examiner*—Albert W. Paladini
*Attorney, Agent, or Firm*—Boyle Fredrickson Ziolkowski S.C.; Larry Vande Zande

[57] ABSTRACT

A switching filter is disclosed for discriminating false control signals from actual control signals. The switching filter is particularly useful on a high impedance input, such as that of a motor controller. The filter is designed to compensate for capacitive, inductive, and/or resistive coupling between extended control lines that are run in parallel with other power lines. A low impedance is switched into the otherwise high impedance control line input for a brief instant to dissipate and phase shift false control signals to prevent the controller from interpreting the false signals as actual control signals. The filter includes a first resistor connectable to sense a presence of a possible false control signal, and a second resistor, having much lower resistance than the first resistor, connected in a path between the control line input and circuit common. A switch is provided in series with the second resistor to open and close the path between the control line input and circuit common in response to the possible false control signal. A timer is activated by a presence of a possible false control signal on the first resistor and activates the switch to provide a low shunting resistance across the control line to common for the brief period. The low shunting resistance not only dissipates the amplitude of any false signals, but also phase shifts the signals such that the controller cannot recognize multiple, successive false signals as a true control signal.

20 Claims, 3 Drawing Sheets

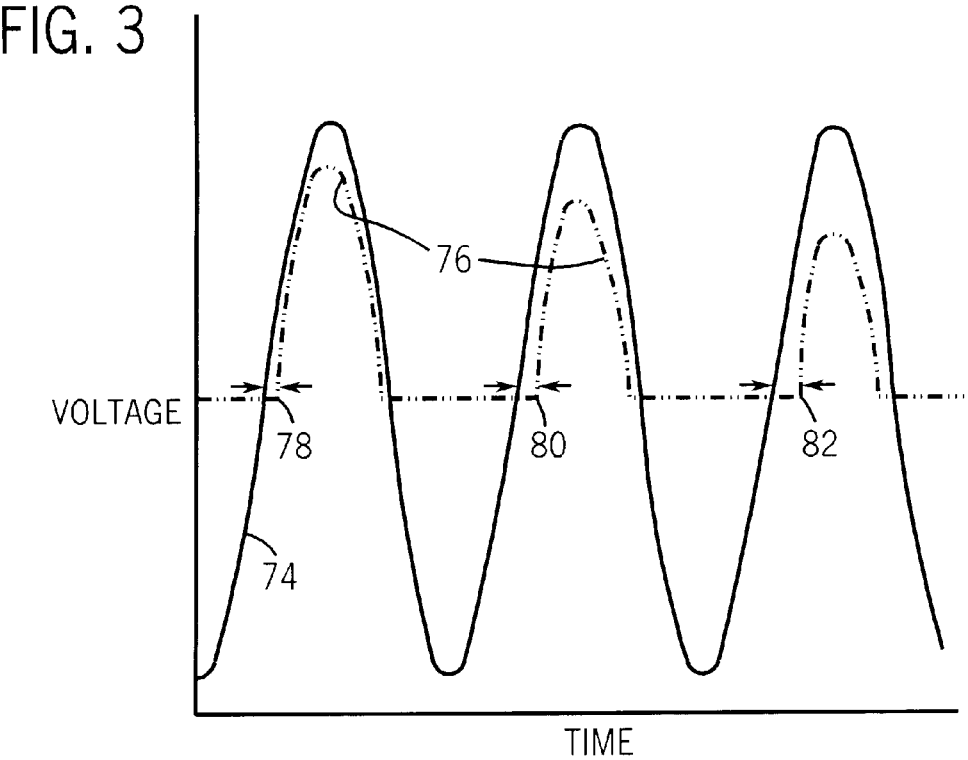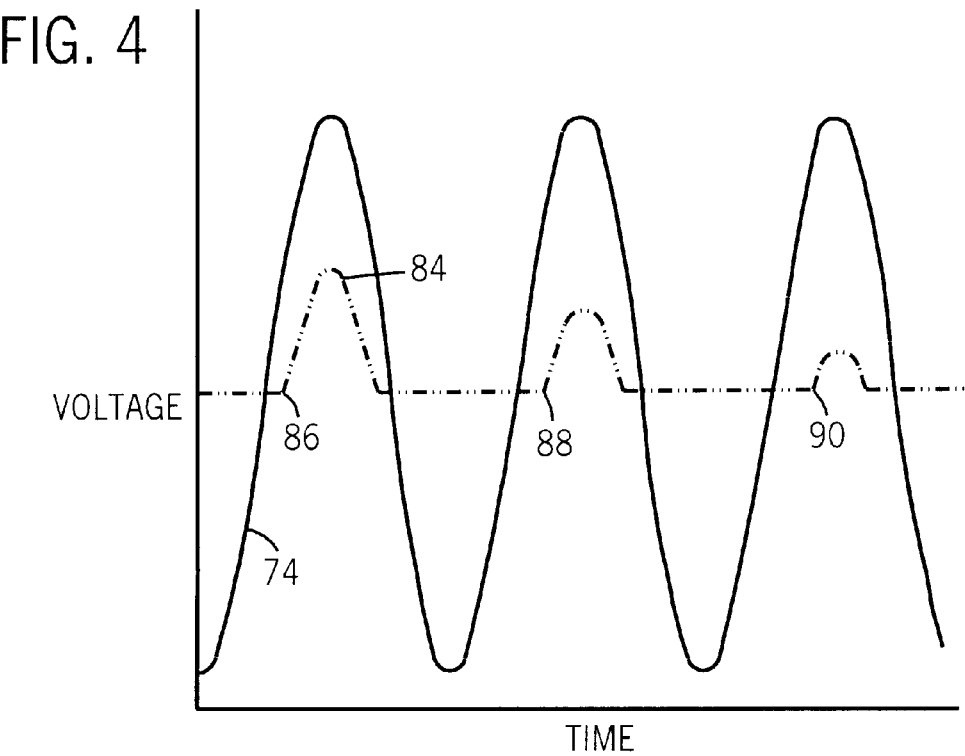

SWITCHING FILTER PRODUCING A LOW IMPEDANCE CONTROL INPUT ON A HIGH IMPEDANCE INPUT LINE FOR DISCRIMINATING FALSE CONTROL SIGNALS

BACKGROUND OF THE INVENTION

The present invention relates generally to a filter for differentiating true control signals from false control signals that result from the coupling of extended parallel control and power lines. More particularly, the invention relates to a switching filter circuit producing a low impedance control input on a normally high impedance input line to discriminate false control signals induced on the control input line by the capacitive, inductive, or resistive coupling of the control line with a power line.

Control circuits, such as motor contactor controls, often are controlled remotely by long control lines which may extend from 100 feet to several miles and are typically run in parallel with other power lines, including the power line that supplies power to the motor and the control circuit. It has been found that running these lines in parallel over extended distances can cause false control signals on the control line due to capacitive, inductive, or resistive coupling between the lines. For example, where a power line and a control line are run in parallel over an extended distance, the inherent capacitive coupling between the lines can act as a near short circuit during the initial power up on the power line. This short circuit can produce a signal voltage on the control line to a control logic input of the control circuit which can then cause contactor closure where no actual control signal is intentionally provided. This can cause a motor to start momentarily when unexpected. Many such control circuits have relatively high input impedance which can compound the problem of capacitive, inductive, or resistive coupling. High input impedance in a control causes the line capacitance to discharge slowly.

Devices which may be remotely controlled by a control line in close proximity to other power lines, include programmable logic controllers, or PLCs, which are available with various types of input and output stages operable at AC or DC voltages. The outputs typically couple or decouple power to various operating elements which can include contactors or starters for motors, actuators for hydraulic or pneumatic valves, and various other devices that are either powered from the PLC outputs or include switching means that are triggered by the PLC outputs. Such PLCs are programmed to activate, or trigger, the output of the PLC in response to conditions at the PLC inputs. Many such controllers trigger on AC logic inputs and to differentiate noise and some false signals, include internal logic circuits that require several consistent, successive, and coincident charges on the logic inputs to activate. These controllers also will only detect such signals that are positive and occur after a zero-crossing. Although such safeguards function adequately in many applications, these controllers are being used in applications where the control lines are run in parallel with power lines at greater and greater distance. These distances inevitably cause greater capacitive and inductive coupling, thereby causing false control signals that the controller was never designed to compensate for.

Where capacitive coupling can cause a false signal on initial power up, inductive coupling can create false signals when the power line is opened. Inductive coupling can continue to supply power on the control line thereby keeping the motor contactors closed. Resistive coupling can occur with poorly insulated or wet wires thereby creating false signals at random times.

One prior art attempt at dissipating or compensating for such false signals includes adding a resistor across the control line to ground. However, the longer the control line, the greater the coupling between the lines which can create high powered false signals. To dissipate these signals, resistors with lower resistivity are required. However, the smaller the resistor, the more heat that is continuously produced when a true control signal is maintained on the control line input. If a larger resistor is used to minimize heat dissipation, the line capacitance is discharged too slowly. In other words, adding a resistor that is large enough to avoid excessive heat buildup, results in ineffective shunting of the false signals created by the leakage capacitance, inductance, and/or line resistance.

It would therefore be desirable to provide an add-on switching filter that could be plugged directly into such a controller, requires no separate power supply, and is capable of shunting false signals across a relatively low resistance path during a strategic portion of the line cycle to avoid excess power waste, thereby dissipating or compensating for line coupling.

SUMMARY OF THE INVENTION

The present invention provides a switching filter that produces a low impedance control input on an otherwise high impedance input line to discriminate false control signals that overcomes the aforementioned problems, and does so at a relatively low cost with a self-powered circuit that can be packaged as a plug-in add-on to existing controllers.

In accordance with one aspect of the invention, a control signal discrimination filter is disclosed capable of discriminating false control signals that are created by the unintentional coupling of a control line to other physically present signal lines. The coupling is often the result of excessive line capacitance, inductance, or the lack of adequate line resistance.

The filter includes a first resistive element connectable to sense a signal having an indication of the presence of a possible false control signal. The first resistive element may be connected directly to the control line or to the AC power line feeding the controller. A second resistive element is placed in a path between the control line and circuit common, and has a much lower impedance than the first resistive element. A switch is placed in series with the second resistive element and is connected to open and close the path having the second resistive element between the control line and circuit common in response to the presence of a possible false control signal as indicated on the first resistive element. The second resistive element, having much lower resistance, is switched ON for brief period to differentiate a false control signal from an actual control signal. If the control signal is a false signal, it will not only be substantially dissipated by the lower resistance to common, it will also become phase shifted so that the logic inputs of the controller will not recognize the false control signal since it requires successive charges coincident with the line voltage input.

To switch the filter into the low impedance shunting mode, a timer is connected to the first resistive element. After the first resistive element senses a zero-crossing, positive going signal from either the control line or the power line, the timer activates the switch after a brief delay.

According to another aspect of the present invention, an optional thermistor can be connected in parallel with the shunting resistive element. The thermistor has an even lower cold resistivity to add even further false signal discrimination. It has been found that the addition of the thermistor as described can increase protection beyond a thousand microfarads of line capacitive coupling.

In yet another aspect of the invention, a method of filtering false control signals created by parallel running power and control lines is disclosed. The invention includes providing an indication of a false control signal and providing a timed resistive dissipation path between the control line and common, wherein the timed resistive dissipation path has a relatively low resistivity. The invention next includes the step of switching ON the timed resistive dissipation path at the onset of a false control signal indication for a brief period to thereby prevent a control from interpreting a false control signal as an actual control signal. One particular way of providing an indication of a false control signal includes monitoring a zero-crossing of all possible control signals and switching ON the timed resistive dissipation path after each zero-crossing to thereby not only dissipate the amplitude of any false signals, but also phase shift the false signals to prevent the control from detecting successive, consistent, false signals as a true control signal.

The present invention creates an effective phase shift and amplitude dissipation of false control signals such that false activation of the controller is prevented. Since the invention requires no separate power supply, it is intended to be packaged such that it can plug directly into the inputs of an existing controller. Although the present invention is described herein with reference to a motor controller, it is believed the present invention will be applicable to a variety of microprocessor based controls operated under similar circumstances.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIG. 3 shows a voltage versus time graph of the resulting false signal dissipation and phase shift superimposed on line voltage according to one embodiment of the invention.

FIG. 4 shows a voltage versus time graph of the resulting false signal dissipation and phase shift superimposed on line voltage according to another embodiment of the present invention.

DETAILED DESCRIPTION OF THE PREFERRED EMBODIMENT

Figure 1:
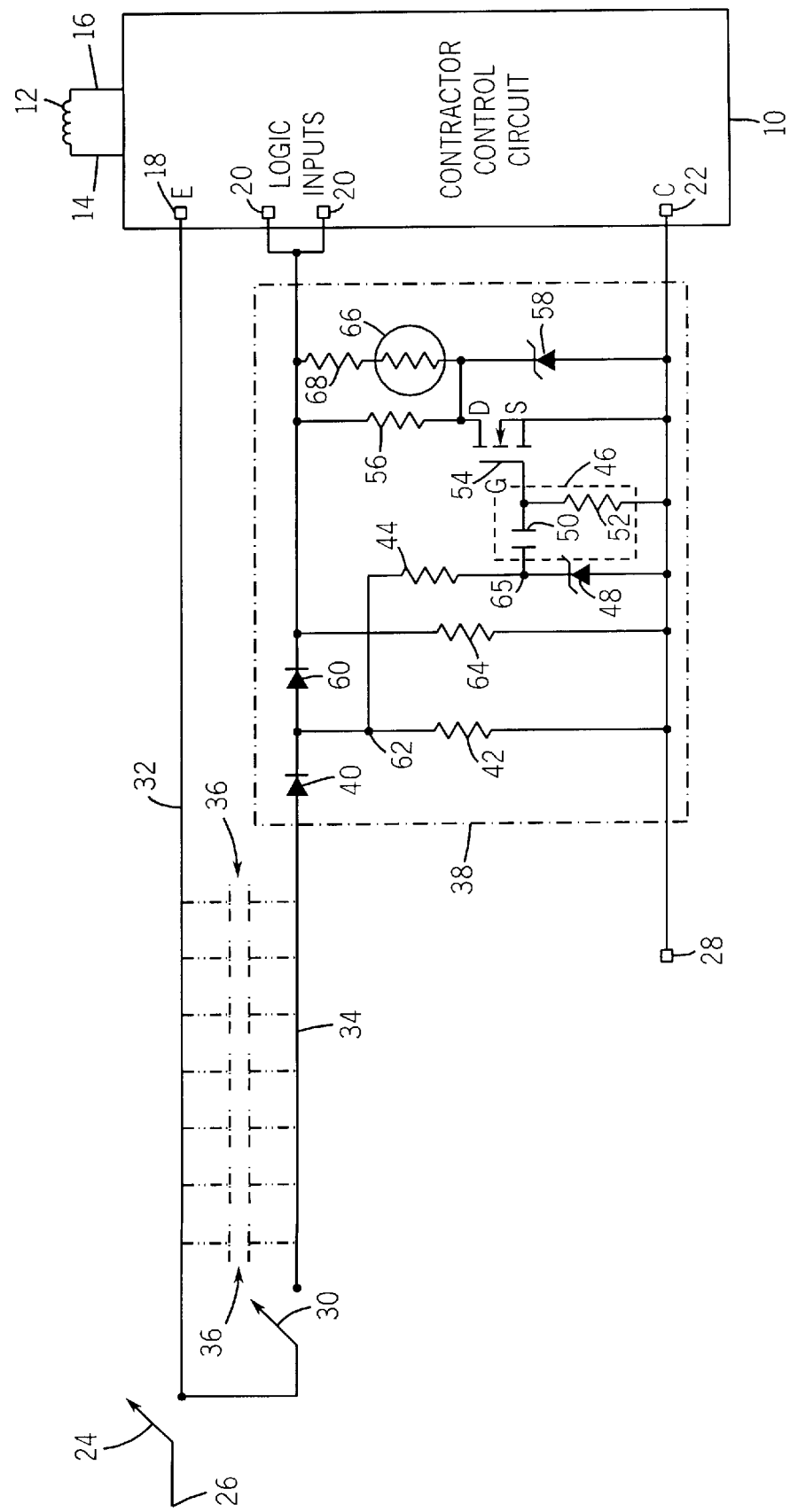
FIG. 1 is a circuit schematic of a system incorporating the present invention.

Referring to FIG. 1, a control circuit, such as a motor controller 10 is connected to, and controls the activation of, a contactor coil 12 by output terminals 14, 16. The controller 10 has a power supply input 18, at least one logic input 20, and a circuit common connection 22. The power supply input 18 is connected to a main switch 24 for connecting the controller 10 to a line voltage 26, typically 115 VAC. The return path for the AC line voltage 28 is connected to the circuit common input 22. The logic inputs 20 are connected to a logic switch 30 which receives line voltage when the main switch 24 is closed. The logic switch 30 is used to trigger the controller 10.

A typical controller 10 includes an internal control circuit that is powered by a 115 VAC power source connected across the power supply input 18 and the common input 22. In some controllers 10, the 115 VAC power also supplies the contactor coil 12 through the controller 10, and the logic inputs 20 may also be activated by the 115 VAC source. Others require a separate DC power source for control. The present invention is applicable to either.

In a typical remote controlled application, the main switch 24 and the logic switch 30 are remotely situated with respect to the controller 10 and are connected to the controller 10 with an extended length power line 32 and an extended length control line 34. In many applications, the extended length power and control lines 32, 34 can extend hundreds of feet, and in some applications, thousands of feet. When a control line 34 is run in parallel with a power line 32, or any other signal carrying line, over any distance, considerable coupling can occur between the lines, such as capacitive coupling. For illustrative purposes, such coupling is shown in phantom as a bank of capacitors 36 that extend the length of the power line 32 and the control line 34. The bank of capacitors 36 demonstrate the amount of capacitive coupling that can occur during switching. However, inductive coupling and resistive coupling can also occur and produce signal voltages at the control logic input 20 when unintended. These false signals can cause controller activation where no actual control signal is intentionally provided by the closing of logic switch 30. In other words, even when the logic switch 30 remains open, closing the main switch 24 can cause a signal voltage on the control line 34 when the bank of capacitors 36 are initially discharged. That is, when the main switch 24 is open and the power line 32 is at the same potential as the control line 34, the capacitive coupling between the lines is discharged. With the coupling capacitance at zero charge, when the main switch 24 is first closed and power is supplied on the power line 32, capacitive coupling 36 acts as a virtual short circuit from the power line 32 to the control line 34 which can "fool" the controller 10 as seeing a control signal on the logic inputs 20 thereby activating the contactor coil 12.

Although many controllers have built in protection for some leakage and capacitive coupling in certain applications, many do not have enough to compensate for the effects of such extended lines in remote applications. In order to reduce the effects of these false control signals, the present invention includes placing a switched impedance filter 38 in the control line 34 and the return path of the line voltage 28. The switched impedance filter 38 is designed to discriminate false control signals from real, or actual control signals by providing a brief, low impedance shunting interval in an otherwise high impedance control input. The filter is designed to differentiate between the false control signals, which have been induced on the control line 34 by capacitive, inductive, or resistive coupling, from actual control signals.

The switched impedance filter 38 is intended to place a low impedance between the control line 34 and circuit common 28 at the same time when the microprocessor and controller 10 is looking for a control signal. Usually, the microprocessor in control 10 is looking for a control signal only at and slightly after the zero-crossing of the line voltage. By shunting a low impedance around the zero crossover point of the waveform for a brief time period, the line capacitance 36 can be charged up quickly and any resulting false control signals on the control line 34 are reduced in amplitude and phase shifted to create inconsistencies so that the controller 10 does not recognize the false signals as an actual control signal on the logic inputs 20.

The switched impedance filter 38 includes a first diode 40 that rectifies the control signals on the control line 34 such that the filter 38 and the controller 10 are only receiving a positive going half cycle after zero-crossing. The line coupling capacitance is allowed to charge to a DC level through resistor 42 shortly after the power line 32 is powered up by closing the main switch 24, thereby reducing the amount of subsequent signal from the power line 32 coupling to the control line 34.

The primary function of resistor 42 is to provide a discharge path for timing capacitor 50 during the line negative half of the cycle. Another function of resistor 42 is to provide an additional path for charging the line capacitance during the positive half of the cycle. Resistor 42 should not be a very low value because it would dissipate excessive power when an actual control signal is applied to control line 34 since it will continuously conduct for the entire positive half cycle. A relatively large value for resistor 42, together with the switched-in low resistance of the present invention, adequately charges the line capacitance.

Resistor 44 is connected to receive an indication of the presence of a possible false control signal on control line 34, and may alternatively be connected to the power line 32. Resistor 44 is connected to a timer circuit 46 and Zener diode 48. The timer circuit 46 includes a capacitor 50 and a resistor 52. Timer 46 is connected to activate a switch 54 which closes a path having a resistor 56 between the control line 34 and circuit common 28.

Switch 54 is preferably a power FET having its source connected to common, the drain connected to the low resistivity resistor 56, which is connected to the control line 34, and having the gate connected to the timer circuit 46. The Zener diode 48 clamps the maximum voltage at node 65, thereby limiting the voltage at the gate of the FET switch 54 to prevent over-voltage from destroying the power FET 54. A transorb 58 is connected between the drain of the power FET 54 and common 28 to protect the drain-to-source connection of the power FET 54 from over-voltage transients which may occur on control line 34.

A second diode 60 decouples node 62 from the logic inputs 20, allowing node 62 and capacitor 50 to quickly slew to a zero level when the AC input voltage goes into the negative half cycle. This will compensate for any decoupling capacitors and diodes in the control circuit of the controller 10, while also allowing capacitor 50 to discharge quickly through resistors 44 and 42 to common 28. Resistor 64 assures the control line 34 and the logic inputs 20 a ground return path to common 20 during a negative half cycle, as well as when the logic switch and control line 34 is open. Resistor 42 not only provides a charge path to ground to help diode 40 charge the line coupling capacitance, it also provides a discharge path for the capacitor 50 of timer 46 during the negative portion of the line signal.

In operation, the low shunting resistance of resistor 56 is switched ON between the control line 34 and common 28 for a brief instant by switch 54 after the first leading edge of a positive going half cycle. Only the positive going edge of an AC voltage signal is passed through diode 40 on control line 34 after a zero-crossing to control switch 54. Current will travel through node 62, resistor 44 and initially through capacitor 50 to the gate of switch 54, turning switch 54 ON. Once switch 54 is ON, the drain of the power FET switch 54 will switch low, pulling one end of resistor 56 to common 28. The Zener diode 48 prevents the continued increase of voltage at the input of capacitor 50 and the gate of the power FET 54. The capacitor 50 then starts to charge through resistor 52, thereby reducing the voltage at the gate of switch 54 below its ON-state. As a result, the power FET switch 54 is turned ON only for a brief period during each interval that the control line input is pulled above common by the line capacitance. The low resistivity shunt resistor 56 is across the control input line 34 for only the critical time, thereby preventing excessive heat buildup. The filter actually attenuates the very same signal that it is using to turn itself ON.

The node 65 reaches a clamped voltage level of 19 volts due to the clamping action of Zener diode 48. This prevents an excessive voltage level from being produced at the gate of the power FET 54, but also prevents a continuous increase in voltage at node 65 as the input line voltage continues to increase. With node 65 clamped to 19 volts, and the gate voltage returned through resistor 52 to common, the gate voltage will decay toward common potential as capacitor 50 charges. When this voltage can no longer maintain an ON bias level at the gate of switch 54, the switch will turn OFF. In other words, when the charging current through capacitor 50 decays, the current through resistor 52 decays so that the voltage across it diminishes to zero. The FET switch 54 will be biased ON for the duration that the voltage exceeds approximately 4.0 V. at gate G, which is the switching threshold voltage of the device.

The values of capacitor 50 and resistor 52 are selected to cause the switch 54 to be ON for a desired duration pulling the low side of resistor 56 to common, providing the desired low impedance to the incoming control line. When the ON-time ends, the low impedance is removed from the line.

In an alternate embodiment of the present invention, the end of resistor 44, opposite of that connected to capacitor 50, can be connected directly to the power line 32 to provide a more consistent drive signal to the switched impedance filter 38. This provides a more positive drive voltage to capacitor 50. However, in this embodiment, the filter 38 switches with every line voltage cycle, whereas in the embodiment of FIG. 1, the filter circuit switches only when necessary, and will not switch when the line capacitance is fully charged for example. Initial test results of the circuits indicate that the filter circuit is most effective with resistor 44 sensing the control line 34, as shown in FIG. 1.

In yet another embodiment, an optional positive temperature co-efficient (PTC) thermistor 66 is connected in parallel with the low resistivity shunting resistor 56. Thermistor 66 is initially at a very low resistivity when in its cold state, and in the preferred embodiment, is 7.5Ω. This provides an extremely low resistance between the control line 34 and common 28 when switch 54 is initially closed. This combination very effectively dissipates false control signals from line 34 and provides very rapid charging of the coupling line capacitance 36. If on the other hand, when the signal on control line 34 is an actual control signal resulting from the closure of logic switch 30, the thermistor 66 will quickly heat to its Curie point where it will assume its higher resistivity, thereby limiting the amount of continuous power dissipation. A Curie point of 85° to 90° C., with a hot resistivity of 5–10 kΩ was found to work satisfactorily. With the use of thermistor 66, the value of the low resistivity shunting resistor 56 can be higher than otherwise required, thus reducing the steady state heat dissipation by the switched impedance filter circuit 38 during normal ON conditions. Optional resistor 68 is a low resistivity resistor connected in series with the thermistor 66 to provide an initial value at a desired level.

Not only does the switched impedance filter 38 of the present invention dissipate, or attenuate, the amplitude of false control signals on control line 34, it also provides a very effective phase shift with each successive false control signal in a series of false control signals. That is, each time a pulse of current turns ON timer 46 and switch 54, and is dissipated through the low resistivity combination at the drain of the switch 54, the line capacitance 36 charges to a higher voltage level. The subsequent cycle voltage at the control input is then delayed because of this precharge on the distributive line capacitance 36. In other words, as the line capacitance charges with each cycle to a next voltage level, the following cycle requires time to reach that voltage level, thereby providing an offset, or phase shift, that progressively increases with each successive cycle.

In a preferred embodiment, resistors 42, 52, and 64 are each 27 kΩ and rated at ½ watt or less, resistor 44 is 10 kΩ at 1 watt, and resistor 56 is 47Ω at 5 watts. The capacitor 50 is 0.022 $\mu$F and with resistor 52 at 27 kΩ, the timer ON-time for switch 54 is approximately 500 $\mu$S. The diode 48 is a 19 V. Zener, the diode 58 is a 200 V. transorb, and the switch 54 is a 10 amp, 400 V. rated power FET with a turn ON voltage of approximately 4.0 V. The lower resistivity shunting resistor 56 is preferably 47Ω and with a rating of at least 5 watts.

Figure 2:
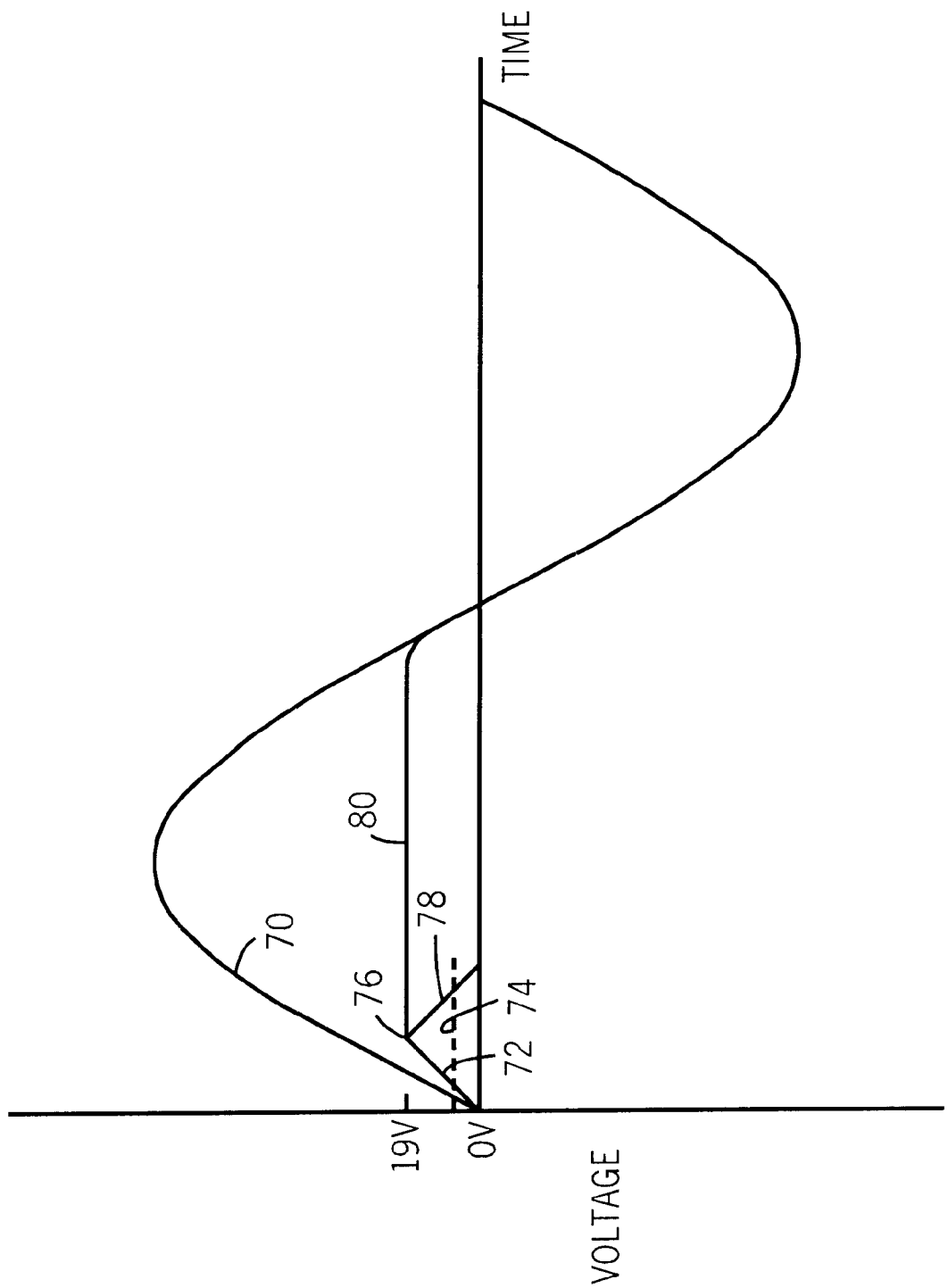
FIG. 2 shows voltage versus time curves for a portion of the circuit of FIG. 1.

FIG. 2 shows a typical sinusoidal line voltage curve 70 as a function of time. A second voltage curve 72 shows the voltage at the gate of the power FET switch 54 of FIG. 1, which is also the voltage across resistor 52. As previously described, and shown in FIG. 2, capacitor 50 is initially at a low charge level and has virtually no voltage drop across it. When the voltage on the capacitor 50 is driven upward by the rising voltage at node 65, the initial low voltage drop across the capacitor is imposed directly onto the gate of the FET switch, as shown by curve 72. Once node 65 is clamped at 19 volts by Zener diode 48, the voltage rise stops at point 76, FIG. 2. Capacitor 50 then charges through resistor 52 so that the gate voltage now decays toward common, as shown by curve 78. Once below the ON threshold voltage 74, the switch 54 turns OFF, while the node between resistor 44, capacitor 50, and Zener diode 48 remains at the Zener voltage of 19 volts for the remainder of the positive half cycle as shown by line 80.

FIG. 3 shows the results of three successive cycles after the main switch 24 of FIG. 1 is first closed. The solid line 74 represents the line voltage on the power line 32 of FIG. 1, and the dashed line 76 represents false control signals on the control line at the logic inputs 20 of the controller 10 of FIG. 1. Referring back to FIG. 3, the dashed line 76 shows the embodiment of the switched impedance filter 38 without the thermistor 66 and optional resistor 68. As is evident, the second and third successive false control signals are not only decreased in amplitude, they are shifted in phase with respect to the line voltage as indicated in the delayed rise time 78, 80, and 82 with respect to one another, thus preventing the controller from receiving consistent, successive false control signals.

FIG. 4 shows additional improvement of the switched impedance filter 38 of FIG. 1 with the insertion of thermistor 66 in parallel with the low resistivity resistor 56. The dashed line 84 shows the voltage at the logic inputs of the controller as lagging the line voltage 74 as shown by the delayed rise time at 86, 88, and 90 for each successive false signal as compared to one another and the line voltage 74. Additionally, the amplitude of the false signals is greatly reduced for each successive, recurring false signal so that the controller will not activate.

The switched impedance filter 38 as shown in FIG. 1 is a preferred embodiment. As such, various alternatives and equivalents are possible. For example, the timer 46 could be replaced with more advanced timers, but at the sacrifice of increased component cost. The power FET 54 could be replaced with various other switches for different power needs, and the thermistor 66 and optional resistor 68 may not be required in certain applications.

It has been found through testing that some controllers will activate with just 0.27 $\mu$F of line capacitance. In contrast, incorporating the present invention with a low resistivity resistor 56 of 47Ω, without the thermistor 66 and optional resistor 68, the controller did not activate with line capacitance up to and including 263 $\mu$F. With the addition of the thermistor 66, having a cold resistivity of 7.5Ω, this circuit will allow the same controller to handle even much higher line capacitance. It is believed that such improvements provided by the present invention will apply equally to any type of microprocessor based control that monitors signal conditions around the zero-crossing of the line voltage, or an equivalent point, to differentiate false control signals from actual control signals in a self-powered package.

One particular advantage of the present invention includes the fact that the switch impedance filter 38 is self-powered, requiring no power source other than the signals on the control line 34. Once the line capacitance is charged up, the circuit essentially ceases operation. When the control line is powered from an actual, true control signal, the filter circuit does not draw excessive power, particularly after the thermistor switches to its higher resistance state. In an actual application, it is contemplated that the present invention will be packaged to allow installation of the filter 38 by simply unplugging the control line 34 from the logic inputs 20 and the return path of the line voltage 28 from the circuit common input 22 of the controller 10, plug in the filter 38 to the controller 10 and reinstall the control line 34 and the return path of a line voltage 28 into the filter 38.

The present invention has been described in terms of the preferred embodiment, and it is recognized that equivalents, alternatives, and modifications, aside from those expressly stated, and are possible and within the scope of the appending claims.

We claim:

1. A control signal discrimination filter capable of discriminating false control signals comprising:

a first resistive element connectable to sense a signal indicating a presence of a possible false control signal from a control input line;

a second resistive element, having lower impedance than the first resistive element and connected in a path between the control input line and circuit common; and a switch connected to open and close the path between the control input line and the circuit common in response to the presence of a possible false control signal as sensed by the first resistive element such that the path having the second resistive element is switched ON for brief periods to differentiate a false control signal from an actual control signal.

2. The control signal discrimination filter of claim 1 further comprising a timer connected to the first resistive element and the switch to activate the switch for a brief period as defined by the timer.

3. The control signal discrimination filter of claim 1 further comprising capacitive coupling between the first resistive element and the switch.

4. The control signal discrimination filter of claim 1 further comprising a thermal sensitive resistive element connected in parallel with the second resistive element, the thermal sensitive resistive element having a cold resistivity less than the second resistive element such that when the switch is initially activated, a resistively lower than that of the first and the second resistive elements is placed across the control line and common.

5. The control signal discrimination filter of claim 1 wherein the first resistive element is connected to the control input line and further comprises a wave rectifier in the control input line.

6. The control signal discrimination filter of claim 1 wherein the first resistive element is connectable to sense AC signals on the control input line.

7. The control signal discrimination filter of claim 1 wherein the first resistive element is connectable to sense AC signals on an AC supply line.

8. The control signal discrimination filter of claim 1 wherein the switch is a power FET and is capacitively coupled to the first resistive element.

9. The control signal discrimination filter of claim 1 further comprising:
   a wave rectifier in the control line input to provide half-wave rectified signals to the first resistive element;
   a timer connected to the switch to activate the switch for a brief period in response to a triggering signal received from the first resistive element, the timer comprising a capacitor and a resistor, each sized to provide a desired ON-time of the timer;
   a Zener diode connected to the switch, the first resistive element, and circuit common to prevent excessive voltage to the switch; and
   a thermal sensitive resistive element connected in parallel with the second resistive element, the thermal sensitive resistive element having a cold resistivity less than the second resistive element such that when the switch is initially activated, a resistively lower than that of the first and the second resistive elements is placed across the control line and common.

10. A control signal discrimination circuit for use with a control circuit having a control line in close proximity to other power lines that may cause false control signals on the control line, wherein the control signal discrimination circuit prevents activation of the control circuit due to the false signals, the control signal discrimination circuit comprising:
    a first resistive element sensing an AC signal;
    a timer circuit connected to the first resistive element and circuit common and triggered by the sensed AC signal;
    a switch connected to and activated by the timer circuit; and
    a second resistive element connected to the control line and the switch such that when the switch is activated, the second resistive element is connected to the circuit common thereby providing a low impedance input for a period to avoid control circuit activation during false signal presence on the control line.

11. The control signal discrimination circuit of claim 10 wherein the timer is triggered by the control line.

12. The control signal discrimination circuit of claim 10 further comprising a thermistor connected in parallel with the second resistive element, the thermistor having a cold resistivity lower than that of the first resistive element and the second resistive element.

13. The control signal discrimination circuit of claim 10 wherein the switch is a power FET and the filter further comprises a Zener diode connected between the first resistive element, the timer, and the circuit common to prevent a damaging voltage to the power FET.

14. The control signal discrimination circuit of claim 10 wherein the timer comprises a capacitor coupled between the first resistive element and the switch to provide a controlled ON-time for the switch.

15. The control signal discrimination circuit of claim 10 wherein the first resistive element is connectable to sense AC signals on the control line.

16. The control signal discrimination circuit of claim 10 wherein the first resistive element is connectable to sense AC signals on an AC supply line.

17. A method of discriminating false control signals created by parallel running power and control lines comprising the steps of:
    providing a timed resistive dissipation path between the control line and common, the timed resistive dissipation path having relatively low resistively;
    providing an indication of a false control signal; and
    switching ON the timed resistive dissipation path at the onset of a false control signal indication for a brief period to thereby prevent a control from interpreting a false control signal as an actual control signal.

18. The method of claim 17 wherein the step of providing an indication of a false control signal is further defined as monitoring a zero-crossing of all possible control signals and the step of switching, switches ON the timed resistive dissipation path after each zero-crossing.

19. The method of claim 17 further comprising the steps of phase shifting a false signal to prevent the control from detecting successive, consistent false signals as an actual control signal.

20. The method of claim 17 further comprises the step of dissipating the amplitude of a false signal to prevent the control from detecting successive, consistent false signals as an actual control signal.

* * * * *